Jan. 19, 1937.  A. G. REZ  2,067,949
MEANS FOR AND METHOD OF APPLYING COLOR TO MOLDED GLASS ARTICLES
Filed Feb. 20, 1933  5 Sheets—Sheet 4
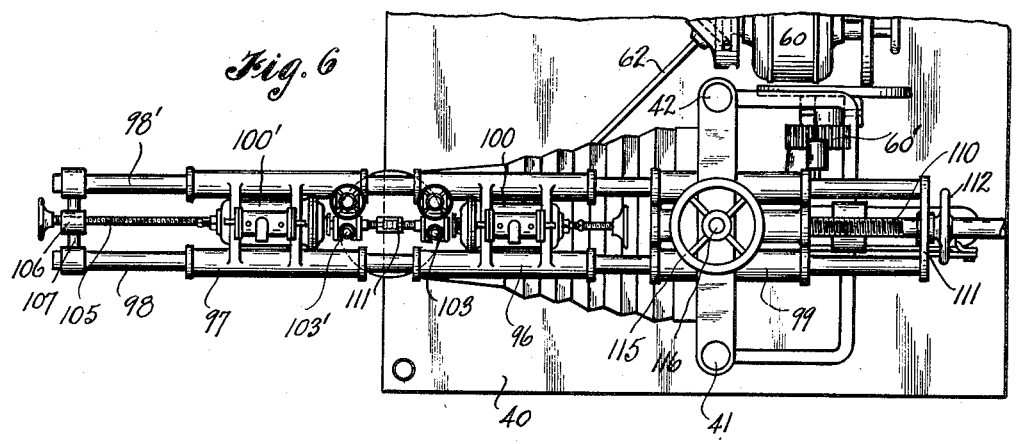
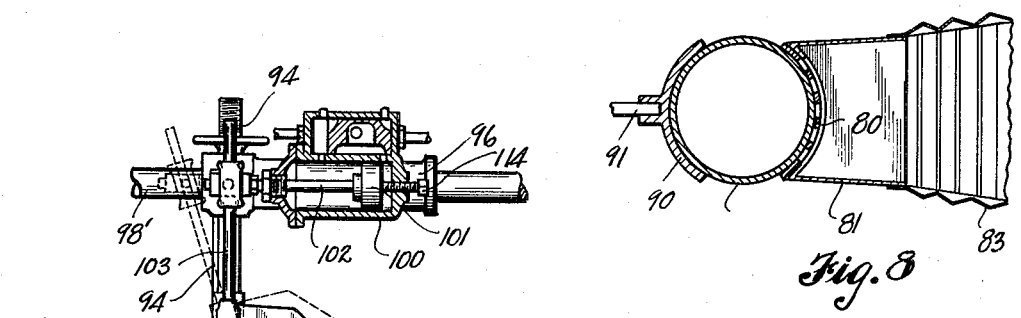
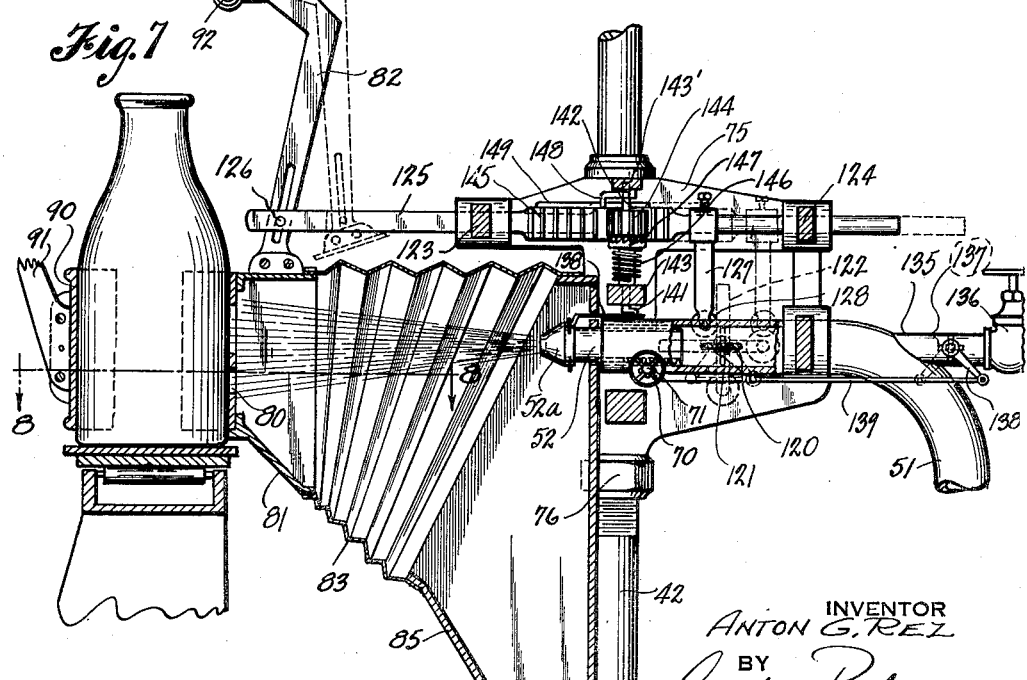
INVENTOR
ANTON G. REZ
BY
Cook & Robinson
ATTORNEY Jan. 19, 1937.  A. G. REZ  2,067,949
MEANS FOR AND METHOD OF APPLYING COLOR TO MOLDED GLASS ARTICLES
Filed Feb. 20, 1933  5 Sheets—Sheet 5
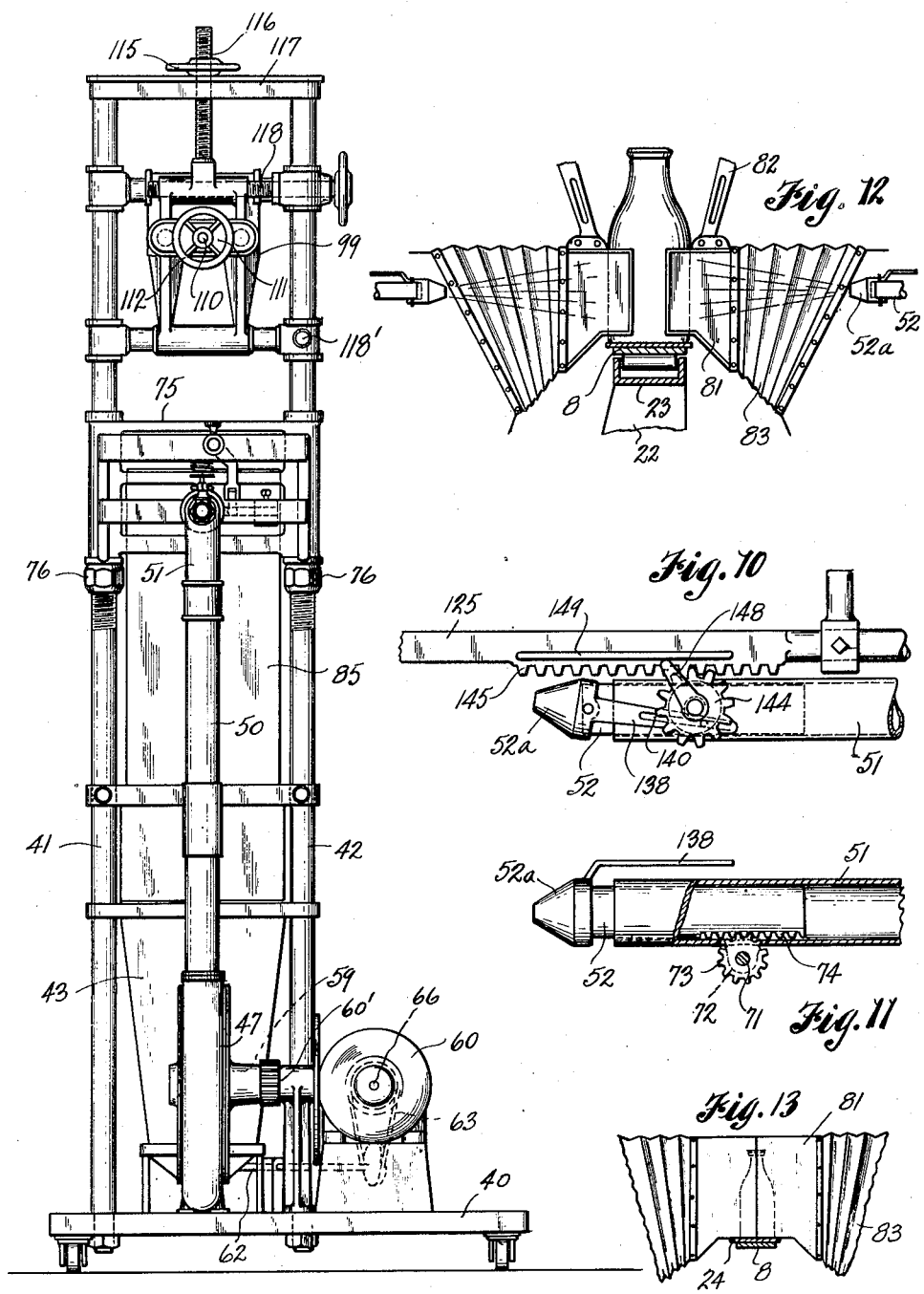
INVENTOR
ANTON G. REZ
BY
Cook & Robinson
ATTORNEY Patented Jan. 19, 1937

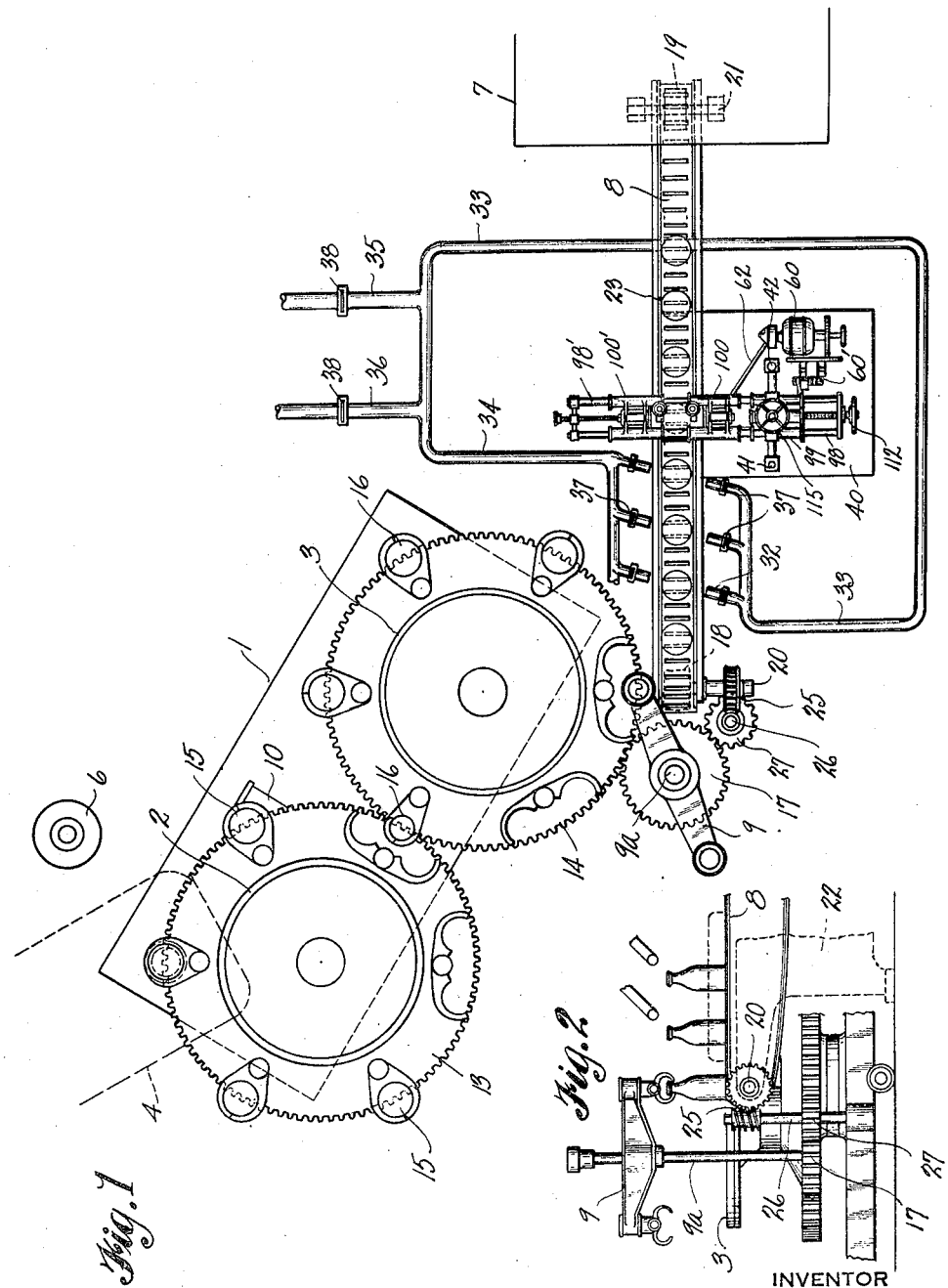

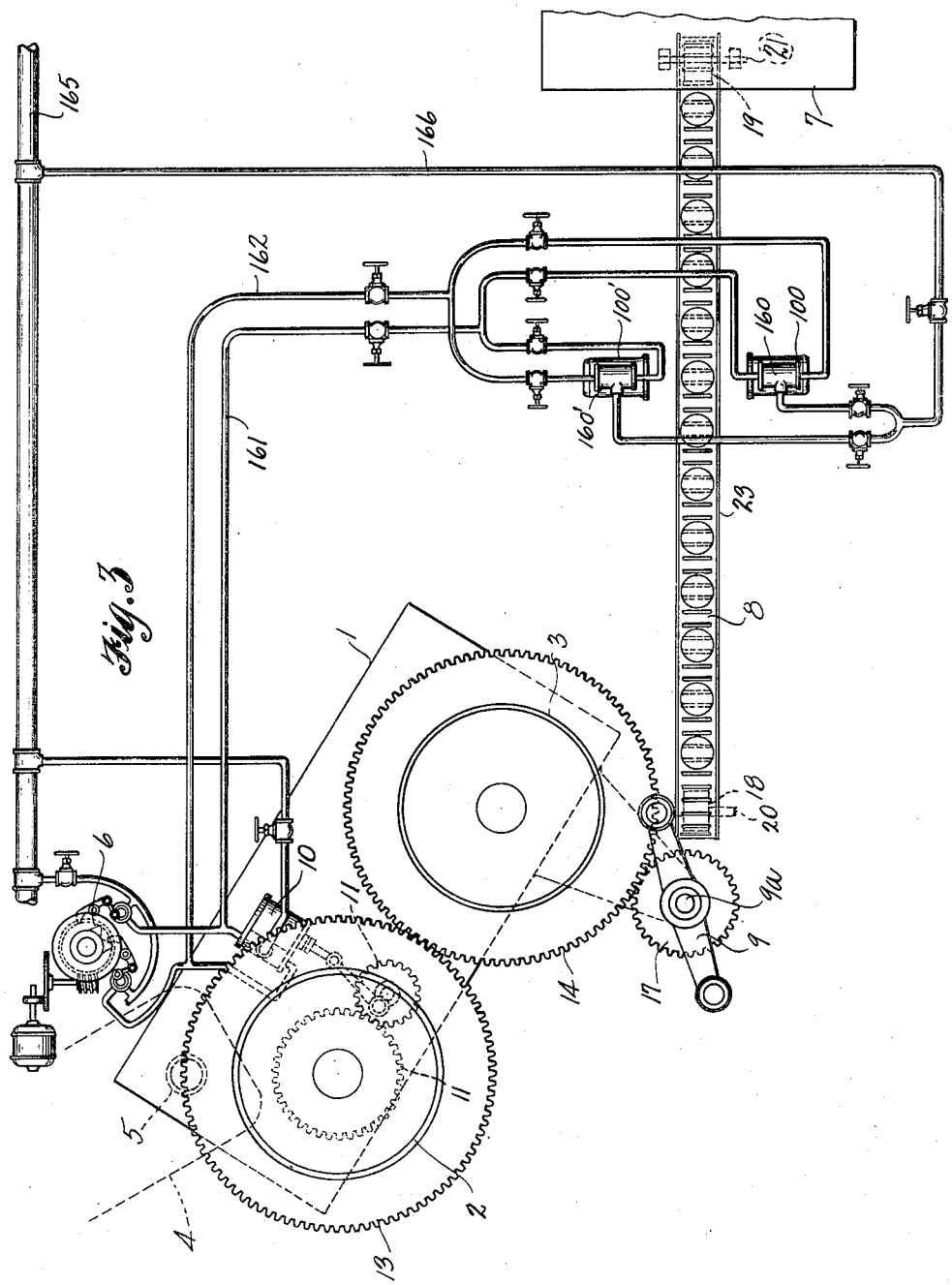

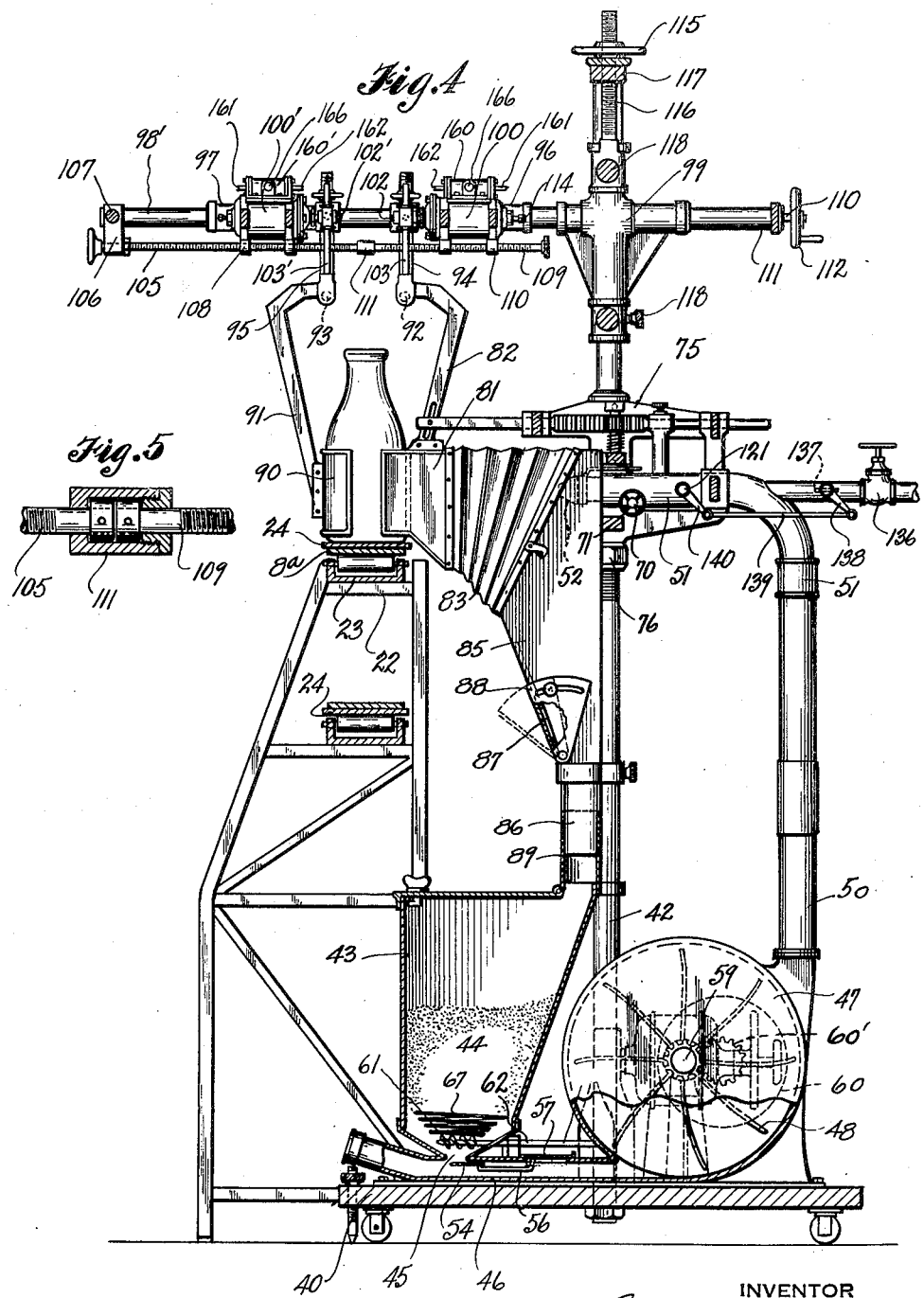

2,067,949

UNITED STATES PATENT OFFICE 2,067,949

MEANS FOR AND METHOD OF APPLYING COLOR TO MOLDED GLASS ARTICLES

Anton G. Rez, Seattle, Wash.

Application February 20, 1933, Serial No. 657,644

11 Claims. (Cl. 49—1)

This invention relates to a method of and means for changing the existing apparent color of a molded glass article wholly or in part, and for applying designs, characters, words, symbols, etc. of various colors to pressed, blown or molded glassware such as bottles, glasses, jars, slabs, plates and articles of various structural shapes.

More particularly, the invention resides in the formation of designs, words or characters on molded glass vessels, as well as in the transforming of the existing color wholly or in part of a glass vessel by the application thereto of a different colored glass pigment, or vitrifiable glass color, or color glass flux, or enamel, or the like, while the article still retains an initial molding heat from the melting tank, and after it has been so handled and treated mechanically that the heat of the article has been brought to a degree, which for convenience may be called a "prepared initial heat" suitable for effectively and satisfactorily fusing the pigment into and on the glass body.

The principal object of this invention is to provide a commercially practical and satisfactory means for, and method of forming colored designs, words or characters on glass articles, or for changing the original color of a glass article wholly or in part during the process of its automatic manufacture, which does not change or interrupt the usual speed or the order of procedure in the automatic manufacture.

Another object of the present invention resides in the combination with the conveyor of a molding machine whereby the molded articles are delivered from the blowing table to the lehr for annealing, of a mechanism for the automatic application of characters, or for the total or partial coloring of the articles; and which mechanism is movable to different positions along the conveyor at which the temperature of the articles will be most satisfactory.

It is also an object of this invention to provide means for the uniform application of coloring material to the article, preferably but not necessarily in its dry, natural state.

It is also an object of the invention to so locate the apparatus for applying this colored pigmented glass, or vitrifiable glass color, or glass flux, or glass enamel, at such distance from the point of delivery of articles from the molding machine, that the glass articles will, by the time they reach it, have lost that amount of their original heat through automatic motion in the open, that there may be a satisfactory fusing of the ground glass, pigment or vitrifiable glass color without causing it to flow, blister or burn out completely or in part or to lose its color from excessive heat unsatisfactory to fusion. In other words, instead of changing the fusing temperatures of various pigments to satisfy the continuously varying heat of the molded glass article, the pigment applying machine itself is moved farther from or closer to the point of delivery of articles from the blowing molds.

It is also an object of this invention to provide a novel mechanism for carrying out the operation, which is easily and readily applicable to any glass blowing or pressing machine commonly known or now in general use in the art, and without requiring any alterations or structural changes in the machine as it already exists.

Another object of this invention resides in the provision of a protective chamber, or guard, which encloses the specific mechanism for applying the vitrifiable glass color, or the like, to the molded glass article while and after the initial heat of the article has been modified to prepared initial heat, thereby to protect adjacent articles during use of the device from the particles of color material, either floating in the air in the form of dust or splashed on when carried by a liquid vehicle.

More specifically stated, this invention resides in the carrying out of the various steps of the present process of applying and fusing glass pigment, vitrifiable glass color, or glass flux or glass enamel or the like, to glass articles to form predetermined characters, designs or words, or to color the entire article or a part of it, by a mechanism synchronized in its action with the machinery whereby the articles are molded, and comprising in combination, mechanism to adjust and to regulate the initial heat of the articles to be treated; mechanism for placing the article in position for treatment; mechanism for holding the articles secure during the application of pigment; mechanism whereby a stencilled shield, which determines the form of character or design, may be applied to the articles prior to application of the pigment; an enclosing housing for protecting adjacent parts of hot glass objects from contact by particles of pigmented glass or the like; mechanism for causing an air current or blast to automatically deliver glass pigment or the like against the stencilled shield or article while applied to the article; mechanism for removing the articles from treating position and for restoring them to their travel toward the annealing chamber or lehr, and mechanism synchronizing all operations with those of the molding machine and for restoring the various parts of the mechanism to positions in readiness for receiving and treating the next article to be presented thereto.

Other objects of the invention reside in the various details of construction, in the combination of parts, and in their mode of operation as will hereinafter be described.

In accomplishing these and other objects, and for carrying out the various steps in the process, I have provided the improved details of construction, the preferred forms of which are illustrated in the accompanying drawings wherein—

Fig. 1 is a plan view, diagrammatically illustrating the relative position and means of operating the various parts of a glass molding machine with which a mechanism embodied by the present invention has been associated.

Fig. 2 is a fragmental view in side elevation, showing a part of the glass molding machine adjacent which the mechanism, embodied in the present invention, is to be located, and illustrating the mechanical means for transferring bottles from the machine to the conveyor belt and means for advancing the belt.

Fig. 3 is a view diagrammatically illustrating the driving and operating connections between the blowing machine, the transfer device, the conveyor and the air pistons associated with the present color applying mechanism.

Fig. 4 is an enlarged side elevation of the present color applying device as functionally associated with the conveyor; the latter being shown in cross section.

Fig. 5 is a sectional detail of a part of the adjusting mechanism of the present machine.

Fig. 6 is a plan view of the color applying device.

Fig. 7 is an enlarged sectional view of the upper part of the color applying device as applied to an article.

Fig. 8 is a cross section on line 8—8 in Fig. 7.

Fig. 9 is a front elevation of the color applying machine.

Fig. 10 is a detail of the nozzle actuating mechanism.

Fig. 11 is another detail, showing the nozzle adjusting means.

Fig. 12 is a detail of an alternative construction.

Fig. 13 is a diagrammatic view of color applying mechanism when color is applied all around the glass object simultaneously and multiple outlets for color and complete surrounding of the article by the guard chamber is necessary.

An important feature of the present invention resides in the provision of a mechanism that is readily applicable to present day automatic molding machines for making bottles, jars, light globes, etc., for the formation thereon of designs, words or characters or for changing the apparent color of the article entirely or in part, without any change or alteration in the usual order of procedure of making the article by the automatic machinery; the present method requiring only an additional step or operation interposed between the delivery of molded articles from the blow table and their delivery into the lehr for annealing.

Explanatory to the invention, it will here be stated that it is now common practice, with automatic molding machines, to use a traveling belt conveyor for transferring the molded glass articles from the blow table to the lehr for annealing. This conveyor, as used in connection with automatic molding machines as now generally in use, is driven by a mechanical connection with an operating part of the transfer mechanism whereby the glass articles are removed from the mold and deposited on the conveyor. This connection causes the conveyor to be intermittently advanced in timing with the delivery of the articles thereonto so that the articles will be evenly and definitely spaced on the conveyor. In some instances this conveyor delivers the molded articles directly into the lehr. In other instances, the articles are manually transferred from the conveyor to the lehr. However, the present mechanism is arranged adjacent the conveyor to provide for application of the color, design, or character forming pigment to the articles before they reach the removal point and it is also a provision of this invention that the pigment applying mechanism be of a character easily shiftable along the conveyor so that the pigment may be applied to the articles when their temperature has been lowered to a proper degree for reception of any certain pigment; it being understood that the color and character forming pigments of different colors require different applying temperatures and also that articles of different size leave the molding machine at different temperatures, usually the larger sizes are cooler than the smaller articles. The temperature of the articles will gradually drop during the period of travel between the molding machine and the lehr, thereby providing a range of temperature suitable for various pigments.

Referring more in detail to the drawings—

In Figs. 1 and 3, I have illustrated in a diagrammatic manner, the general arrangement of a common type of glass blowing machine, transfer mechanism, conveyor and lehr, such as is now extensively used for the automatic manufacture of bottles, jars, glasses and the like. In these views, 1 designates the blowing machine in its entirety. 2 and 3 respectively, designate the molding table and blow table. 4 designates the continuous supply tank from which molten glass may be delivered by an automatic feeder designated as 5, which is governed by a timing mechanism designated at 6. The lehr into which the molded articles are delivered for annealing is designated at 7; the conveyor belt whereby the articles are conveyed from the blow table into the lehr is designated at 8 and the transfer arm mechanism whereby the glass articles are removed from the blow molds and placed on the conveyor is designated at 9.

Any suitable device, such as an electric motor or compressed air motor, may be employed to drive the machine. However, it will be here stated that the electric motor or compressed air motor is operated under the control of the automatic feeder and timer which is governed and operated by the operator, and adjusted by him from time to time, according to the necessity of the heat of glass required to deliver a certain amount of glass at certain speed for the manufacturing of the particular article. The mode of operation calls for consecutive delivery of glass; an intermittent and synchronous rotary movement of the two tables; the movement of transferring by the transfer arm 9 of articles from the table 3 to the conveyor 8 and an intermittent advancement of the conveyor belt in synchronism with the movement of the table.

In Fig. 3 an air motor 10 has been shown operatively connected with a gear 11 which operates in mesh with a gear 12 for driving the table 2. The two tables are equipped, respectively, with large gear wheels 13—14 of like size operating in mesh so that table 3 is driven from table 2 and their proper relationship for operation is maintained. Molds 15 are located at regular intervals on the table 2, and a like number of molds 16 are arranged on the table 3. As the molds 15 successively register with the feeder 5 they receive a charge of glass. As they successively reach the delivery point incident to rotation of the table, they are caused to open, then the transfer arm takes hold of the molded glass article in the open mold and by a definite swinging movement and releasing operation deposits it on the conveyor 8. The transfer arm 9 is here shown as driven by suitable gearing from the blow table gear 14, while the conveyor belt 8 is driven through a geared connection with the transfer arm shaft 9a. However, it might have a direct connection with the blow table gear.

As seen in Fig. 2, the transfer arm 9 is fixed on a vertical driving shaft 9a and this has a driving gear 17 fixed thereon in mesh with the gear wheel 14.

The conveyor belt 8 may be of any suitable construction, preferably it consists of pivotally joined links 8a of sprocket chain construction operable about supporting wheels 18 and 19. These are supported respectively by shafts 20 and 21 rotatable in opposite ends of a frame structure 22. The upper run of the belt operates horizontally on a supporting guide 23, see Fig. 4, and the belt is usually covered with a second belt woven of asbestos material, as at 24, to prevent absorption of heat from the molded articles by the belt. The sprocket mounting shaft 20 is here indicated in Figs. 1 and 2 as being driven by a geared connection, as at 25, with a vertical shaft 26 which, in turn, has a driving gear 27' fixed thereon in mesh with the driving gear 17 fixed on shaft 9a in mesh with a gear 14 of the blow table. The important requirement of the driving and timing mechanism is to effect a synchronous advancement of the conveyor belt in accordance with the delivery of the articles thereonto from the blow table.

Briefly described, the operation of the automatic machine is as follows:

Molten glass is maintained in a suitable quantity in the tank 4 and gobs of proper size and temperature are delivered from the automatic feeder 5 as controlled by the timer 6, successively into the molds 15 arranged on the mold table 2. With the delivery of each gob of glass, the table advances a distance to bring the next mold into receiving position. The glass gobs for the automatic manufacture of bottles, or the like, are given an initial form by pressure applied thereto while in the molds 15. Then, as the molds 15 successively reach a certain station adjacent the blow table, they are automatically opened and the molded glass gobs are transferred, by means not shown, into the molds 16, on the blow table 3. After a molded gob has been transferred into a blow mold, the mold will be advanced by successive movements of table 3, to positions at which blow heads, not shown, are applied thereto to blow the articles to their finished form. Finally the molds 16, in succession, reach the delivery station, and they are then caused to open up and the finished articles are transferred therefrom to the conveyor belt by the transfer arm 9 which places them in upright position on the belt, as shown in Fig. 2.

It will be stated here that there are automatic machines having only one table, with a succession of press or blank molds and blow molds, and there are also machines that gather their own glass without using an automatic feeder. There are also automatic molding machines that have continuous motion of their parts instead of intermittent. However, this continuous motion of the tables is synchronized in their speed with the timing of taking the glass charges into the blank molds, either by feeder or by gathering their own glass, and the delivery of the articles from the blow mold after they are finished, and their placing on a conveyor or delivery to the lehr, is similar. The general method of operation, from point of view of glass heat, and consecutiveness of motion in delivering the finished article, is like that already described, and this invention is made for use in connection with any of the above mentioned automatic machines manufacturing glass articles.

When the molded articles are delivered from the molds 16 onto the conveyor, they retain varied degrees of heat. Their temperature is dependent primarily on the size of the article and secondarily on the speed of the manufacturing. While this initial heat which is approximately twelve hundred degrees F. at the time of delivery of articles onto the conveyor, would be satisfactory to fuse certain colors, it must be kept in mind that the fusing points of various colors are governed by the materials from which they are manufactured, and range from nine hundred seventy-five to eleven hundred degrees. Therefore, the initial heat of the articles at the time of delivery onto the conveyor has to be controlled and reduced, and kept constant, in order to maintain a possible condition for fusing articles in speedy succession without causing any great amount of loss or spoilage. When the articles reach the lehr they ordinarily retain a temperature of one thousand degrees F., thus in this drop of about two hundred degrees, a suitable position along the conveyor may be found for the application of the different pigments used.

The different pigments have a varied fusing point between nine hundred seventy-five to twelve hundred degrees F., therefore, it is evident that a certain time should elapse before applying the pigment to an article after it has been delivered from the mold at twelve hundred degrees F. in practical manufacture, the heat of glass also varies, as small articles made at a high speed require more viscous, therefore, hotter glass than the larger objects made out of larger gobs of glass fed into the machine at slower intervals. While it is possible to change the fusing point of the various pigments by adding thereto elements or materials that have the property of raising or lowering the fusing point, still it can be seen that such a method of operation would not be practical in high speed automatic manufacture subjected to constant changes of temperature, especially since pigments are sensitive to the extent that very little change, as low as fifty degrees, will influence the outcome of fusing and either burn out the color completely or cause it to blister, or result in other defects not permissible in articles to be commercially merchandized. Therefore, one of the characteristic features of this invention is in the provision for moving the entire pigment applying apparatus along the conveyor to a point at which the temperature of the articles is approximately correct for any selected pigment and in the provision of means whereby the heat of the articles, after leaving the blow mold, may be controlled so that when they arrive at the location of the color applying machine their heat will be the exact degree for proper fusing of the pigment. Then the operator of the machine can easily superintend and regulate the coloring process by observing the finished article; it being understood that, for the application of different pigments requiring quite different temperatures for their application, the entire pigment applying machine will be shifted farther from or closer to the point of delivery from the molding machine but all slight changes of temperature which are constantly occurring during the applying of pigment, are taken care of in the present invention by use of a plurality of air delivery devices as designated in Fig. 3, whereby cool air, or heated air may be projected against the articles after they have left the blow mold, thus to reduce or raise their temperature to a proper degree before reaching the pigment applying machine. In the event that their temperature should be too high, it may be reduced by delivery of cool air. If it is too low, it may be raised by use of the blowers whereby a hot blast of air or flame may be directed against them. These air delivery nozzles are designated at 32 in Fig. 3. They are connected by pipes 33 and 34 with supply pipes 35 and 36, respectively, for delivery of hot and cold air. Valves 37 are provided in the nozzles and valves 38 in the supply pipes and these are adjustable so that heating or cooling may be controlled to a fine degree. This mode of operation does away with the necessity of especially trained or scientific operators and makes possible the operation by the usual glass house crew, simply by the exercise of careful watch over the heat of the glass.

Cooling of the articles begins with their engagement by the transfer arm and continues until it reaches the color applying machine. The particular type of conveyor mechanism is not important, however, the location of the machine and the mechanical control of temperature of the article until color has been applied is the important feature.

It is significant that the articles as delivered from the blow molds must reach the lehr before they cool too much, since with too rapid cooling after a certain temperature has been reached, inside stresses develop that will cause breakage of the articles. Therefore, the present method provides for speedily performing the operation of applying the pigment while the article is momentarily arrested in its delivery to the lehr, after suitable mechanical means has insured a desirable "prepared initial heat" in the article. The speedy obtaining of the "prepared initial heat" at a certain position, and the coloring and fusing of color in various speeds as controlled by the glass molding machine, enables the articles to be delivered into the lehr colored and before they reach a temperature that is dangerous to their formation.

The pigment applying machine is best illustrated in Figs. 4 to 9 inclusive. In its present embodiment it comprises a caster mounted base plate 40 movable along the supporting floor to locate the mechanism at a desired position between the receiving and delivery ends of the conveyor. On the base plate two parallel, upright posts 41 and 42 are secured to support various parts of the mechanism later described. Also supported on the base is a hopper or container 43 for the coloring pigment designated at 44 in Fig. 4, and this pigment may feed through a base opening 45 in the hopper into a tube 46 opening at its inner end into a fan housing 47 in which a fan 48 is operable to create suction in the tube whereby air and a certain amount of the pigment will be drawn into the fan housing to be forcibly discharged with the intaken air through an upwardly directed pipe 50 leading into a horizontally mounted pipe 51 which, at its end, mounts a pigment spray nozzle 52; there being a telescopic connection in pipe 50 which is provided in order to permit of a vertical adjustment of the nozzle, for various applications, as will presently be understood.

As best shown in Fig. 4, the pigment conducting tube 46 is open at its outer end for the intaking of air as a carrying medium for the pigment. Also, there is a slide valve 54 adjustable across the hopper outlet 45 to control the amount of pigment delivered. This valve is connected by a rod 56 with an adjusting piece 57 slidable on pipe 46 which may have graduations thereon to indicate the amount of opening uncovered by the valve at any time.

The fan housing has a mounting and driving shaft 59 mounted in the fan housing 47 and this is driven by an electric motor 60 mounted on the base 40 and operatively connected to the fan shaft through the mediacy of a variable speed transmission gear mechanism designated at 60' whereby any desired fan speed may be obtained.

In order that there will be no interruption in the flow of pigment to the conducting pipe 46, I have provided a rotary agitator 61 within the base of the hopper at the end of a driving shaft 62, which shaft, at its other end has a driving connection with the motor. As shown, the connection comprises a belt 63 operating about pulleys 64 and 65 on the shaft 62 and motor shaft 66, respectively. The agitator 61 is merely a spiral brush fixed on the shaft 62 and in rotating, it engages with a spiral 67 fixed in the hopper so that the spiral is caused to vibrate incident to rotation of the shaft.

The delivery nozzle 52 is horizontally disposed at a height at which it may deliver the pigment directly against the articles as conveyed thereto by the belt 8. As seen in Figs. 4 and 7, the nozzle is adjustable within the end of tube 51 to permit its being moved closer to or farther from the articles and this adjustment is made by rotation of a hand wheel 70 that is fixed on a shaft 71 rotatably mounted in bearings 72 formed on the under side of tube 51; the shaft 71 being equipped, as shown in Fig. 11, with a gear wheel 73 meshing with rack teeth 74 in the nozzle tube, so that by rotating the hand wheel in one direction or the other, the nozzle will be extended or retracted accordingly.

The nozzle mechanism, in its entirety, is supported by a frame structure 75 which is vertically slidable on the posts 41 and 42 to adjust the nozzle to the height required for treatment of various articles. The adjustment of frame 75 is retained by nuts 76 that are threaded onto the posts and which support the frame against sliding downwardly thereon.

For an application of pigment to an article, such as a bottle, glass, jar or the like, to form any particular design or character thereon, I provide a stencil bearing the design which is applied against the article. Then the pigment is discharged from the nozzle directly against the stencil, and will be fused with the unprotected surfaces of the vessel. The stencil has an asbestos lining on the side adjacent the glass to prevent sticking together.

As disclosed best in Figs. 7 and 8, the stencil plate 80 is shaped to conform to the shape of the vessel, and it is removably fixed in a rectangular, supporting frame 81 which, in turn, is fixed to the lower end of its operating arm 82. A hood 83 of accordion like construction, encloses the nozzle and also the path of delivery of the pigment from the nozzle to the article being treated. The hood 83 at one end is fitted snugly about the frame 81 and at its other end is applied to a pigment collecting chute 85 which has a spout 86 leading downwardly therefrom and opening into the receptacle 43. Thus, all that pigment which is waste in the application against the stencil, will be confined within the hood and will fall back to the hopper for subsequent use. Air from the nozzle exhausts from the collectors 83 and 85 through an outlet 87 in the latter provided with an adjustable closure 88. Since the collector chute 85 is movable with the frame 75, the spout 86 is telescopically applied to an inlet spout 89 of the hopper 43 to permit of this adjustment without any disconnection.

In order that the stencil plate 80 may be pressed firmly against the glass article for application of the pigment, it is necessary to provide a support for the article to oppose the pressure of the stencil plate. Therefore, I have provided a support in the form of a curved plate 90, also asbestos lined on the inner side and shaped to the curvature of the article and fixed to the lower end of an operating arm 91 which is similar to the arm 82. The arms 82 and 91, as shown in Fig. 4, are pivotally supported at their upper ends by shafts 92 and 93 respectively, which are fixed in the lower ends of arms 94 and 95 depending from frames 96 and 97 slidable on a pair of supporting rods 98—98′ disposed in parallel relation transversely above the conveyor belt and fixed rigidly in a frame 99 that is vertically adjustable on the upper end portions of the posts 41 and 42.

In order that the stencil plate 80 and the support 90 may not interfere with the intermittent advancement of the articles thereto by the conveyor, they must necessarily be opened apart first for reception of an article between them, then for release of the article after the pigment has been applied. To effect the necessary opening apart and then the closing together of these opposed parts, the arms 82 and 91 are actuated from and toward each other and this arm action is effected by air pressure applied through the medium of cylinders 100—100′ in which pistons, as shown at 101 in Fig. 7 are reciprocally contained. The pistons of the two cylinders have rods 102—102′ connected operatively at their outer ends with rocker levers 103—103′ extended upwardly from the arms 82—91 respectively, so that an application of air to the outer ends of the cylinders, whereby the pistons are actuated inwardly will cause the arms to move pivotally on their supports 92 and 93 thus to cause a swinging apart of the lower ends of the arms to move the stencil 80 and the support 90 apart for reception of the article to be treated between them, then, by an opposite movement of the pistons, the arms will be moved in an opposite direction and the stencil and support 90 will be brought against opposite sides of the article as seen in Fig. 8 to hold it securely for treatment. This action of the pistons 101 is timed to take place while the articles to be treated are at rest, that is, between successive advance movements of the conveyor belt and this action is effected by timing the application of air to the cylinders in synchronism with the conveyor movement.

The pistons are fixed in the frames 96 and 97, respectively, and these frames are adjustable from and toward each other to adjust the spacing of the parts 82—90 to accommodate articles of different size. The adjustment of the frame 97 is effected by an adjusting screw 105 rotatably fixed at one end in a bearing 106 in a connecting bar 107 at the outer ends of rods 98—98′ and threaded through lugs 108 in the frame 97. Adjustment of the inner frame 96 is made by an adjusting screw 109 threaded through lugs 110 on the frame and rotatably connected through a swivel 111 with the end of screw 105 as seen in Fig. 5. Thus, by certain rotative adjustments of the screws 105 and 109 the piston assemblies may be adjusted as is required to accommodate the spacing of the arms 82 and 91 to articles of different size.

I have also provided for bodily adjusting the entire piston mechanism as a unit by longitudinal shifting of the rods 98—98′. As shown in Fig. 6, these rods are slidably mounted in frame 99 and an adjusting screw 110 is mounted rotatably in a cross bar 111 at the inner ends of these rods and is threaded into frame 99. A hand wheel 112 on the screw may be used to rotate the screw, thus to cause the rods to be shifted in their support to properly locate the mechanism relative to the conveyor. Vertical adjustment of the frame 99 on the posts 41 and 42 for raising or lowering the piston assemblies is effected by an adjusting wheel 115 threaded onto a screw shaft 116 extended upwardly from the frame and slidably through a cross bar 117 fixed across the upper ends of the posts. The wheel 115 rests upon the cross bar and when it is rotated the frame 99 will be raised or lowered accordingly. It will be mentioned here also that the closing action of the parts 80 and 90 against the glass articles is limited by limiting the outward travel of the pistons in their cylinders, and this is very accurately determined by stop screws 114 threaded into the ends of the cylinders for engagement by the pistons. Fine adjustment of the stencil mechanism, after the machine has been located adjacent the conveyor, to move it in the longitudinal direction of the belt conveyor, is made by rotation of a hand screw 118, as seen in Fig. 9 which mounts the frame 99 and when rotated in opposite directions, will shift the frame 99 in opposite directions accordingly. An adjustment of the frame may then be held secure by tightening a set screw 118 in the frame against post 42.

In order that there will be no waste of pigment or any uncontrolled application of pigment when the stencil is not applied to an article, provision has been made for shutting off delivery from the nozzle except at times when the stencil is properly applied to the article. For this purpose I locate a butterfly valve 120 in pipe 51, as seen in Fig. 7. This valve has a supporting shaft 121 extended from the tube at one side and on the shaft is fixed a weighted lever 122 that is operable when not restrained, to swing downwardly to close the valve. Slidably mounted in supporting guides 123—124 of the frame structure 75 is a horizontally shiftable bar 125 connected at one end by a pin and slot connection, as at 126, with arm 82 and fixed on this bar between its supports is a downwardly directed arm 127 mounting a roller 128 at its end which operates in rolling contact with and actuates the valve lever 122. This arrangement is such that when arm 82 swings inwardly to place the stencil 80 against the glass vessel, the roller 128 engages the lever 122 and swings it pivotally thereby to actuate the valve 120 to open position for delivery of pigment. When the arm 82 swings outwardly to release the article after an application of pigment, the bar 125 shifts outwardly with movement of the arm 82, the arm 127 disengages lever 122 and the weighted lever swings the valve 120 to closed position.

I also have provided for the admittance of high pressure air in the nozzle when such is desired. For this purpose, I provide an auxiliary air supply pipe 135 opening into pipe 51 and controlled in amount of delivery by a hand lever 136. A butterfly valve 137 is also located in the pipe and this has an operating lever 138 connected by a link 139 with a lever 140 on valve shaft 121 so that both butterfly valves 120 and 137 will open and close together. Thus, when the valve 120 opens for the normal delivery of air, any amount of additional air desired may be admitted through pipe 135 by a proper adjustment of valve 136.

To effect a spread of the pigment as discharged by the nozzle over the entire stencil, I have provided the nozzle with a conical, pivotally movable tip 52a. This tip, as seen in Fig. 10, has an arm 138 extending therefrom along the top of the nozzle and provided with a longitudinal slot 140 which receives therein the end of a crank 141 on shaft 142 revoluble in supports 143—143'. A gear wheel 144 is revoluble on shaft 142 and adapted to mesh with rack teeth 145 on rod 125 when the latter moves outwardly. Rotation of the gear 144 winds up a spring 146 coiled about the shaft 142 and connected at one end with the gear and at its other end with a ratchet wheel 147 adapted to be turned in one direction only by gear 144. During this winding operation, the shaft is held against rotation by a finger 148 fixed thereto to slidably engage a rib 149 on the rod 125. The arrangement provides that on a closing movement of the stencil over an article to be treated, the rack teeth of rod 125 causes gear 144 to rotate and wind up the spring. Then, at the completion of this movement, at the time the valve opens for discharge of the pigment, the finger 148 is freed from the rib 149 and this permits the crank shaft 142 to be rotated and thereby to oscillate the nozzle 52a in a horizontal manner to cause the effective spreading of the pigment.

It will be here explained that the periods for application of pigment must be timed to take place during the periods of rest of the conveyor, and since the conveyor movement is under control of the timer 6, it is practical then to place the operation of the pigment applying apparatus under control of the timer. For this purpose, I have provided suitable air pipe connections between the timer and control valves of the two cylinders 100—100'. One form of connection is shown in Fig. 3 wherein 160—160' designate the control valve mechanism for the cylinders, 161 and 162 are air pipes leading from the timing device 6 and each has a pair of branch pipes leading to the opposite ends of the valve devices which operate in accordance with delivery of air thereto by the timer 6 to shift the valve to effect delivery of air pressure to one or the other end of their respective cylinders for actuating the arms 82 and 90. A pipe 165 supplies air under pressure to the machine and this has a pipe 166 extending therefrom with branches to the two valve devices for the cylinders. Thus, under control of the valves, this air is admitted to the cylinders.

In Fig. 12 is shown an alternative arrangement for application of pigment to two sides of a vessel. In this arrangement the nozzles would be provided in duplicate and they would be supplied either from one or from two sources of supply of pigment under air delivery, as in the manner shown in Fig. 4. In this case, it it only necessary to replace the plate 90 with another stencil support, hood and nozzle equipment as already applied to the other side and operate them in substantially the same manner.

For treating the entire surface of a glass vessel, the two hoods could be made to come together to entirely enclose the vessel, as shown in Fig. 13.

Assuming the device to be so constructed and assembled, its operation in connection with the glass molding machine briefly described is as follows:

Assuming that glass articles to which a design is to be applied are being delivered in regular order onto the conveyor belt 8 from the blow table, and that the belt is being intermittently advanced definite intervals in synchronism with successive operations of the molding machine, the pigment applying apparatus would be located at a selected point adjacent the conveyor between the molding machine and the lehr at which the articles will be substantially the proper temperature for receiving a certain coloring pigment. Then, by manipulation of adjusting devices 112, 105 and 109, the stencil 80 and support 90 may be adjusted into proper relationship with the conveyor for treatment of the articles.

In accordance with the operation of the timing devices, air under pressure is admitted to the cylinders 100—100' for the opening apart of the arms 82—91 for reception of the glass vessels between them. Then the arms close together so that the stencil 80 and support 90 are clamped against opposite sides of the article in a close fit. When the arm 82 swings inwardly to place the stencil against the glass vessel, then valve 520 in the pigment delivery tube 51 is opened and pigment being delivered through the tube under the action of the motor driven fan, will be discharged through the nozzle and against the stencil for application to the vessel; waste pigment being returned through the hood and chute 85 to the pigment container 43. After each pigment applying operation the stencil is moved outwardly and this movement, through the mechanism described, closes off the delivery of pigment.

Perfect fusion of the pigment with the article depends on two items, namely, the right quantity of pigment and the uniform floating of the minute particles. In order to obtain a lighter coat of a certain color, less pigment should be floated on, but the distribution must be uniform. Therefore, the adjusting valve at the base of the hopper 43 is a very important element of this mechanism as it governs the amount of pigment fed to the nozzle.

Adjustment of the speed of the blower is important to the operation since the velocity of the air influences the amount of pigment moved. For this reason the speed transmission gear is interposed between the motor and fan shafts and through this mechanism the speed of the fan can be gradually increased or decreased for obtaining the ideal floating of the pigment to produce either a light cloud or a heavy cloud.

While I have described the operation of this machine in connection with the movement of the glass articles by a conveyor, it is to be understood that the pigment applying apparatus of this character may be used with like success for application of colored designs or characters where the glass vessel is placed in position by hand, or otherwise. Furthermore, it is possible to provide for the application of the pigment to articles on a continuously moving belt.

Another alternative would be to provide a transfer device between such a machine and the blow table whereby the articles would be transferred directly to the machine for applying the pigment.

It is to be understood that various details of construction of the device might be altered to adapt the mechanism to different types of molding machines and different types of conveyors. Furthermore, details of construction of the pigment applying machine itself might be altered to meet certain conditions with respect to speed of operation and character of vessels being treated. Therefore, it is not desired that the claims of this application shall be construed as limited to the details illustrated, but that they be given an interpretation commensurate with the scope of the invention herein disclosed.

Having thus described my invention, what I claim as new therein and desire to secure by Letters Patent is—

1. The method of coloring a molded glass article during the period of its manufacture which consists in directing a fusible coloring pigment against the parts to be colored following removal of the article from the mold and at a location in its course of travel at which its initial molding heat will have decreased to the fusing temperature of the pigment.

2. The method of applying characters, or the like, to a molded glass article during the period of its manufacture which consists of presenting the article, following its removal from the mold and upon arrival of the article at a location in its course of travel where its temperature is satisfactory for fusion of a selected character forming pigment, to means whereby a fusible character forming pigment is applied to character defining areas of the article.

3. The method of applying characters, or the like, to molded glass articles during their period of manufacture, which consists of presenting the articles, following removal from the molds, to means whereby their initial molding heat is controlled, and to other means whereby a fusible, character forming pigment is pneumatically directed against the character defining areas of the articles while their initial molding heat is under control and at that suitable to cause the pigment to be fused therewith.

4. The method of applying characters to articles molded of glass, or the like, during their process of manufacture, which consists of applying a stencil of the character to the article following its removal from the mold and at a location in its course of travel its initial molding heat has been brought to a degree corresponding to that for fusing a selected coloring pigment, then directing the pigment against the stencil for fusing it with the character defining areas of the article.

5. The method of applying characters, designs and the like, to molded glass articles, which consists of presenting each article, following its removal from the mold, to means for mechanically bringing its initial molding heat substantially to the fusing temperature of a selected character forming pigment, then applying a stencil of the selected character or design to the article, then pneumatically floating the pigment against the stencil.

6. The method of applying characters, designs, or the like, of contrasting color, to molded glass articles, during in which they pass from the molds to the lehr their process of manufacture, which consists of presenting the articles, following their removal from the molds, to means whereby a stencil of the design or character is applied thereto, then causing an air jet to be directed against the stencil and a fusible coloring pigment to be admitted to the air jet for delivery thereby against the stencil for fusing with the article over the character defining areas by the initial molding heat remaining in the article.

7. The method of applying characters, or the like, to molded glass articles, during their process of manufacture, which consists of presenting the articles as they are transferred from the mold, to means for artificially reducing the initial molding heat to the fusing temperature of a selected coloring pigment, applying a stencil to the article while at that temperature, causing an air jet to be directed against the stencil, feeding the pigment to the air jet for application thereby to the article for fusing therewith, then delivering the article to the annealing chamber.

8. The method of manufacturing articles of molded glass or the like with integral identifying characters or designs, which consists of molding the articles, removing them from the molds while at a high degree of initial heat, transferring them through a cooling interval, applying a fusible colored glass pigment to character defining areas of the articles while at a location at which their reduced initial molding heat corresponds substantially to that of the fusing temperature of the selected pigment, then annealing the article.

9. The combination with a machine for molding glass articles, a lehr for annealing the articles, a pigment applying machine including a stencil disposed intermediate said molding machine and said lehr, means for conveying the articles from the molding machine to the pigment applying machine and from the pigment applying machine to the lehr, and means operating on the articles between the molding machine and the pigment applying machine for modifying the initial molding heat of the article, said pigment applying machine being movably mounted relative to said molding machine and said lehr, whereby said pigment applying machine may be positioned so that the initial molding heat retained in the articles at the time said articles are submitted to the action of the pigment applying machine will be suitable to cause the pigment contacting with the articles to be fused therewith within the areas defined by the stencil.

10. The combination with a machine for molding glass articles, a lehr for annealing the articles, a pigment applying machine including a stencil disposed intermediate said molding machine and said lehr, means for conveying the articles from the molding machine to the pigment applying machine and from the pigment applying machine to the lehr, said pigment applying machine being movably mounted relative to said molding machine and said lehr, whereby said pigment applying machine may be positioned so that the initial molding heat retained in the articles at the time said articles are submitted to the action of the pigment applying machine will be suitable to cause the pigment contacting with the articles to be fused therewith within the areas defined by the stencil.

11. The combination with a machine for molding glass articles, a lehr for annealing the articles, a pigment applying machine including a stencil disposed intermediate said molding machine and said lehr, means for conveying the articles from the molding machine to the pigment applying machine and from the pigment applying machine to the lehr, and means operating on the articles between the molding machine and the pigment applying machine for modifying the initial molding heat of the articles, so that the initial molding heat retained in the articles at the time said articles are submitted to the action of the pigment applying machine will be suitable to cause the pigment contacting with the articles to be fused therewith within the areas defined by the stencil.

ANTON G. REZ.